United States Patent

Ogawa et al.

[11] 4,110,503
[45] Aug. 29, 1978

[54] MAGNETIC RECORDING MEMBERS

[75] Inventors: Hiroshi Ogawa; Masashi Aonuma; Matsuaki Nakamura; Yasuo Tamai, all of Odawara, Japan

[73] Assignee: Fuji Photo Film Co., Ltd., Minami Ashigara, Japan

[21] Appl. No.: 747,146

[22] Filed: Dec. 3, 1976

[30] Foreign Application Priority Data

Dec. 10, 1975 [JP] Japan .................. 50-147173

[51] Int. Cl.² .......................................... H01F 10/02
[52] U.S. Cl. ................................. 428/64; 252/62.54; 428/447; 428/539; 428/900
[58] Field of Search ................. 428/447, 900, 539; 252/62.54; 427/127, 130

[56] References Cited

U.S. PATENT DOCUMENTS

| | | | |
|---|---|---|---|
| 2,654,681 | 10/1953 | Lueck | 428/447 |
| 3,527,659 | 9/1970 | Keil | 428/447 |
| 3,686,030 | 8/1972 | Preston | 428/447 |
| 3,993,846 | 11/1976 | Higuchi | 428/447 |
| 4,005,242 | 1/1977 | Kopke | 428/447 |
| 4,007,313 | 2/1977 | Higuchi | 428/447 |
| 4,007,314 | 2/1977 | Higuchi | 428/447 |

*Primary Examiner*—Ellis Robinson
*Attorney, Agent, or Firm*—Sughrue, Rothwell, Mion, Zinn and Macpeak

[57] ABSTRACT

A magnetic recording member comprising a non-magnetic support having thereon a magnetic layer of a ferromagnetic powder dispersed in a binder, wherein the magnetic layer contains an organic silicone compound represented by the formula (I):

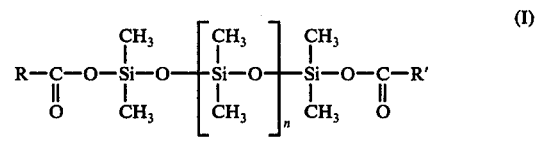

wherein R and R', which may be the same or different, each is a saturated or unsaturated hydrocarbon group containing 7 to 21 carbon atoms, and $n$ is an integer of 0 to 50.

10 Claims, 4 Drawing Figures

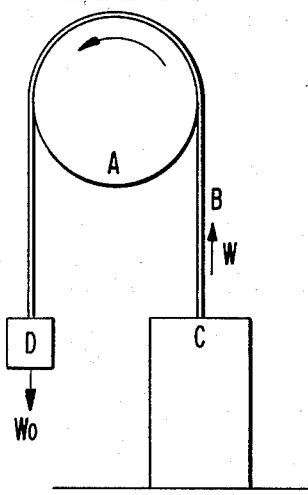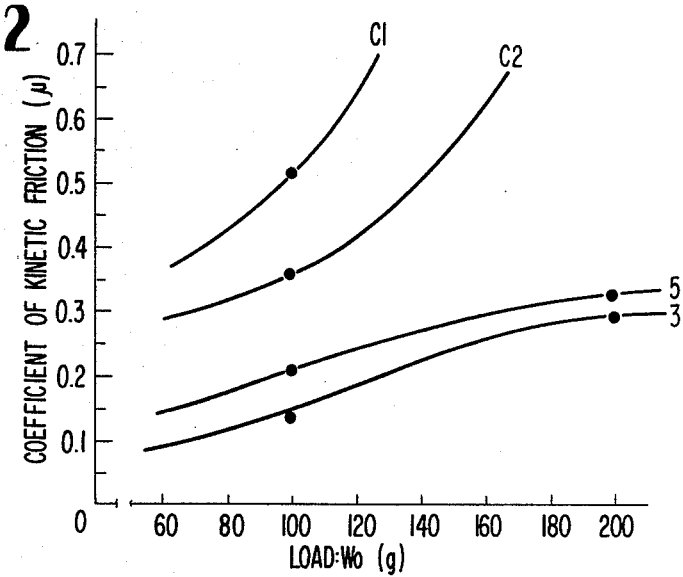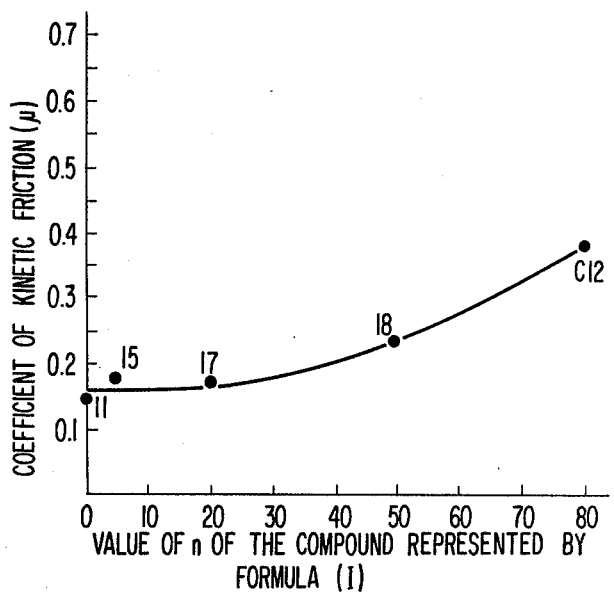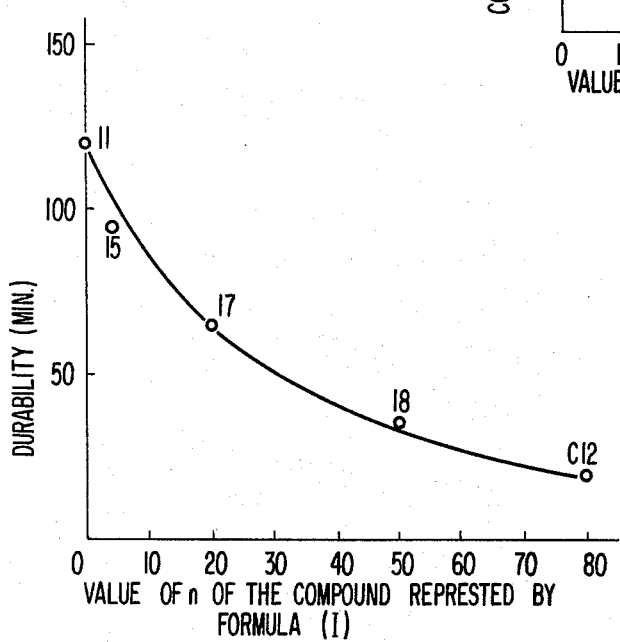

MAGNETIC RECORDING MEMBERS

BACKGROUND OF THE INVENTION

1. Field of the Invention

The present invention relates to mangetic recording members, and more particularly, it is concerned with high density magnetic recording members having excellent lubricity and durability.

2. Description of the Prior Art

With magnetic recording members, in particular, video tapes, since the tape runs while contacting a fixed magnetic head, a drum, a guide pole, etc., the tape must have a low coefficient of friction and run smoothly and stably over a long period of time, and at the same time, the tape must have excellent durability since it is vigorously rubbed with a rotary magnetic head.

For this reason, in the past, higher aliphatic acids, higher aliphatic acid esters, paraffin based hydrocarbons, silicone oils, e.g., dimethyl polysiloxane, diphenyl polysiloxane, etc., have been incorporated into a magnetic coating containing a ferro magnetic powder and a binder. In particular, a silicone oil has advantageously been used since the desired effect can be attained by addition of a small amount of the silicone oil.

The above additives are described in Japanese Patent Publication Nos. 18064/1966, 186/1968, 669/1968, 15624/1972, U.S. Pat. Nos. 2,654,681, 3,470,021, 3,497,411, 3,525,694, 3,634,253, etc.

These conventional additives, however, have failed to provide video tapes with sufficient lubricity and durability. Moreover, the additives tend to ooze out on the surface of a magnetic layer, i.e., the so-called "blooming" phenomenon occurs, and thus, blooming, etc., have occurred during the storage of the tapes.

In addition, as organic silicone compounds, those compounds represented by the formula (II) (Japanese Patent Publication No. 14249/1974)

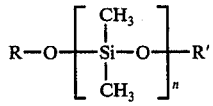

(II)

wherein R and R' are hydrocarbon groups containing 7 to 26 carbon atoms, and $n$ is an integer of 1 to 20; and the formula (III) (Japanese Patent Application (OPI) No. 32904/1975)

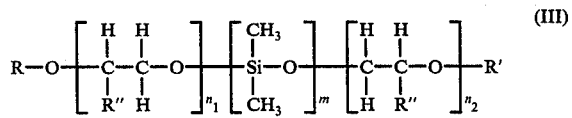

(III)

wherein R and R' are hydrocarbon groups containing 8 to 18 carbon atoms, R" is hydrogen or methyl, and $15 \geqq m \geqq 1$, $16 \geqq (n_1 + n_2) \geqq 2$; are known.

The compounds represented by the formula (II) are not desired since durability is not improved, and since their compatibility with binders is low, thus causing the blooming phenomenon to occur. Although the reason for this is not clear, it is believed that the bonding between the hydrocarbon group and silicone is an ether bond having a low polarity.

The compounds represented by the formula (III) have been found undesired in that the kinetic coefficient of friction between the tape and a head drum of a video tape recorder is high under a high load, thus sometimes causing a squeeking. Moreover, a sufficient improvement in durability has not been obtained. Although the reason for this is not clear, it is believed due to the hydrophilic alkyleneoxy chains contained in the molecules.

SUMMARY OF THE INVENTION

Accordingly, an object of the present invention is to provide a novel magnetic recording member devoid of the above defects.

Another object of the present invention is to provide a magnetic recording member having excellent lubricity and steady running properties.

A further object of the present invention is to provide a magnetic recording member having excellent durability and resistance to wear.

Further, another object of the present invention is to provide a magnetic recording member free from blooming.

It has now been found that the above objects are attained by using organic silicone compounds represented by the formula (I) shown below as an additive.

That is, the present invention provides a magnetic recording member comprising a non-magnetic support having thereon a magnetic layer with a ferromagnetic powder dispersed in a binder, wherein the magnetic layer contains at least one organic silicone compound represented by the formula (I):

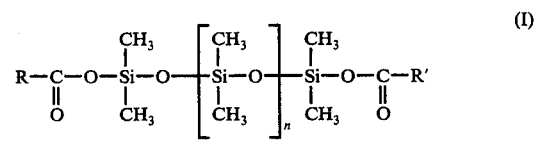

(I)

wherein R and R', which may be the same or different, each is a saturated or unsaturated hydrocarbon group containing 7 to 21 carbon atoms, and $n$ is an integer of 0 to 50.

BRIEF DESCRIPTION OF THE ACCOMPANYING DRAWINGS

FIG. 1 is a schematic view of an apparatus for measuring the coefficient of kinetic friction ($\mu$) in the examples of the present invention;

FIG. 2 is a graph illustrating the relationship between the load ($W_0 \cdot g$) and the coefficient of kinetic friction ($\mu$) in the sample of Example 1;

FIG. 3 is a graph illustrating the relationship between the value of $n$ of the compound represented by the formula (I) used in the sample of Example 4, and the coefficient of kinetic friction ($\mu$) under the 100 g load; and FIG. 4 is a graph illustrating the relationship between the value of $n$ of the compound represented by the formula (I) used in the sample of Example 4, and the durability (min.).

DETAILED DESCRIPTION OF THE INVENTION

Examples of substituents, R and R', of the organic silicone compounds of the present invention represented by the formula (I) are alkyl or alkenyl groups containing 7 to 21 carbon atoms. In more detail, suitable examples include saturated aliphatic acid residue groups, e.g., caprylic (n-octanoic), pelargonic (n- nonanoic), capric (n-decanoic), undecylic (n-undecanoic), lauric (n-dodecanoic), tridecylic (n-tridecanoic), myristic (n-tetradecanoic), pentadecylic (n-pentadecanoic), palmitic (n-hexadecanoic), heptadecylic (margaric, n-heptadecanoic), stearic (n-octadecanoic), nonadecanoic (n-nonadecanoic), arachic (n-eicosanoic), behenic (n-docosanoic), etc., and unsaturated aliphatic acid residue groups, e.g., lauroleic (9-dodecenoic), 4-tetradecenoic, palmitoleic (zoömaric, 9-hexadecenoic), petroselinic (6-octadecenoic), oleic (9-octadecenoic), elaidic (9-octadecenoic), vaccenic (11-octadecenoic), linoleic (9,12-octadecadienoic), eleostearic (9,11,13-octadecatrienoic), linolenic (9,12,15-octadecatrienoic), parinaric (9,11,13,15-octadecatetraenoic), arachiodonic (5,8,11,14-eicosatetraenoic), gadoleic (9-eicosenoic), erucic (13-dococenoic), brassylic (13-docosenoic), etc.

Representative examples of the compounds represented by the formula (I) are shown below:

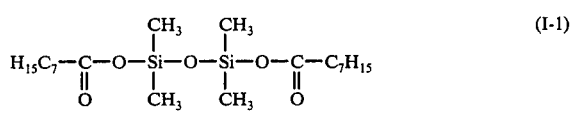
(I-1)

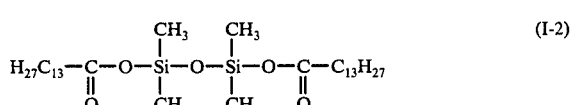
(I-2)

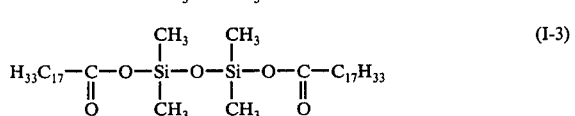
(I-3)

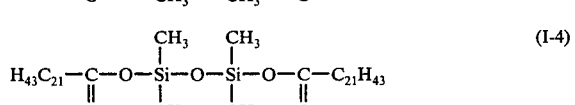
(I-4)

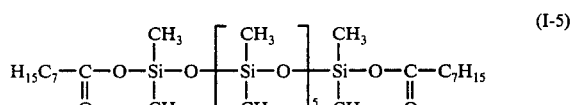
(I-5)

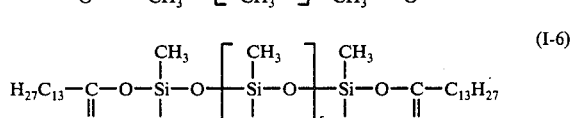
(I-6)

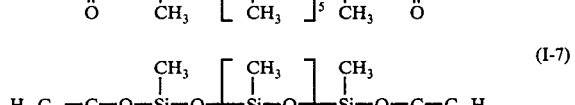
(I-7)

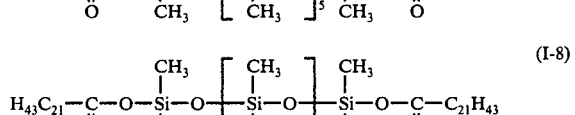
(I-8)

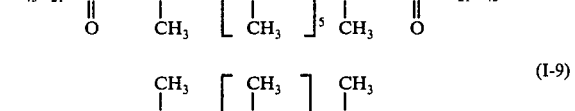
(I-9)

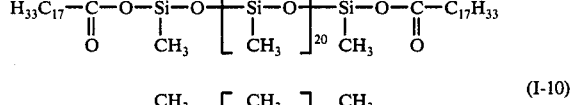
(I-10)

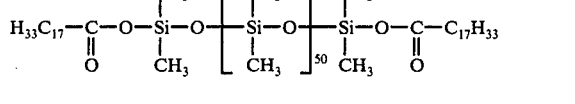
(I-11)

The number of carbon atoms of the saturated or unsaturated hydrocarbon groups represented by R and R' in the formula (I) each is preferably 7 to 21, and R and R' may be the same or different. Where the number of carbon atoms is below 7, no improvement in resistance to wear is observed, and where the number of carbon atoms is 22 or more, it has been confirmed that not only are the starting materials not easily commercially available, but also the effect of reducing the coefficient of kinetic friction decreases.

The value of $n$ is 0 to 50, and where the value is above 50, no improvement in the coefficient of kinetic friction and durability is observed. $n$ is preferably 0 to 20, and more preferably 0 to 5. In particular, $n = 0$ is most preferred. Accordingly, the compounds set forth above are preferred in the following order, the most preferred being listed first: (I-1) ro (I-4); (I-11); (I-5) to (I-8); (I-9); and then (I-10) and improvements in effects are achieved with the compounds as listed in this order.

The organic silicone compounds of the present invention can be used individually or in combination with each other.

The objects of the present invention can be attained by using the organic silicone compound of the present invention in an amount of about 0.1 to about 5 parts by weight, preferably 0.2 to 3 parts by weight per 100 parts by weight of the ferromagnetic powder. Where the amount is below about 0.1 part, no reduction in the coefficient of kinetic friction is observed, and where the amount is above about 5 parts, not only does blooming tend to take place, but also the strength of the magnetic layer is decreased and the durability is deteriorated.

Methods of synthesizing the organic silicone compounds of the present invention, and examples thereof are shown below.

These methods are well known and are described in W. Noll, *Chemistry and Technology of Silicones*, Academic Press (1968). Suitable examples thereof are as follows:

(1) A method comprising reacting a partial hydrolyzate of dimethyl dichlorosilane (see U.S. Pat. No. 2,381,366):

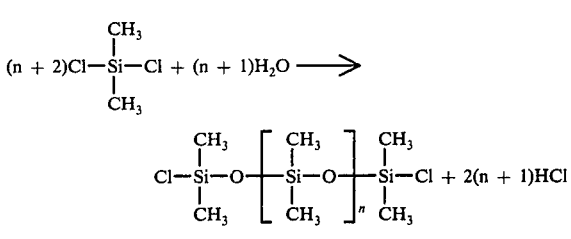

or α,ω-dichloropolydimethylsiloxane obtained through the equilibration reaction of dimethyldichlorosilane and cyclic dimethylsiloxane (see U.S. Pat. Nos. 2,421,653 and 3,162,662):

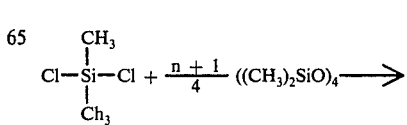

-continued

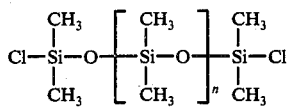

with a saturated or unsaturated aliphatic acid represented by RCOOH (or R'COOH or RCOOH and R'COOH) in the presence of a hydrogen chloride acceptor such as an organic amine, or the like:

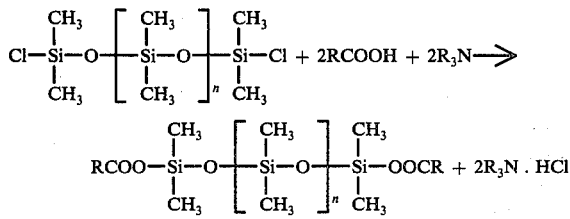

Suitable preferred amines which can be used include tertiary amines such as trimethylamine, triethylamine, pyridine, quinoline, etc.

(2) A method comprising subjecting a partial hydrolyzate of a dimethyldialkoxysilane (see U.S. Pat. No. 2,415,389):

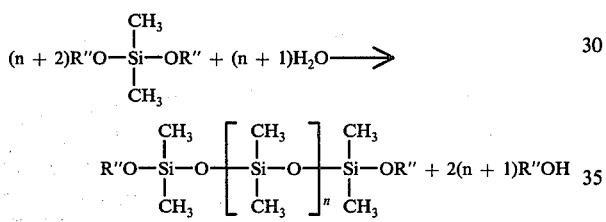

or an α,ω-dialkoxypolydimethylsiloxane obtained through the equilibration reaction of a dimethyldialkoxysilane and cyclic dimethylsiloxane (see French Pat. No. 1,116,196):

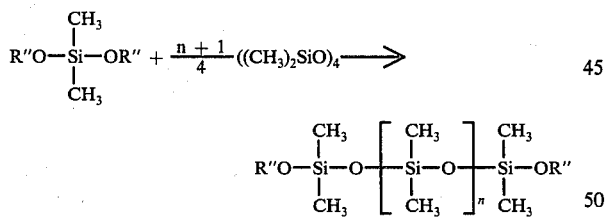

to an ester interchange reaction with a saturated or unsaturated aliphatic acid represented by RCOOH (or R'COOH or RCOOH and R'COOH) in the presence of an acid or alkali catalyst.

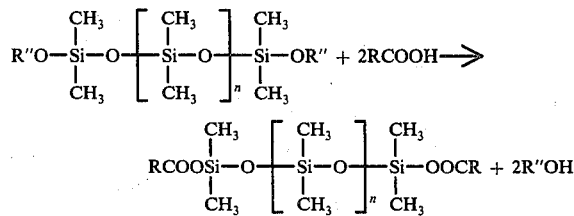

Suitable examples of acid catalysts include acids such as sulfuric acid, trichloroacetic acid, trifluoroacetic acid, etc., and suitable examples of alkali catalysts include bases such as sodium hydroxide, potassium hydroxide, etc.

(3) A method comprising subjecting a partial hydrolyzate of dimethylmonochlorosilane, or α,ω-dihydrodienepolydimethylsiloxane obtained through the equilibration reaction of tetramethyldisiloxane obtained by the above hydrolyzation, and cyclic dimethylsiloxane (as described in W. Noll, *Chemistry and Technology of Silicones,* Academic Press (1968)):

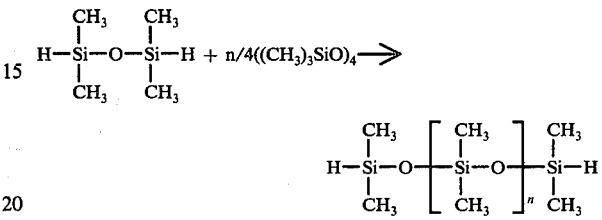

to a dehydration reaction with a saturated or unsaturated aliphatic acid represented by RCOOH (or R'COOH or RCOOH and R'COOH) in the presence of a metal catalyst (e.g., zinc, cadmium, etc.) (as described in W. Noll, *Chemistry and Technology of Silicones,* Academic Press (1968)):

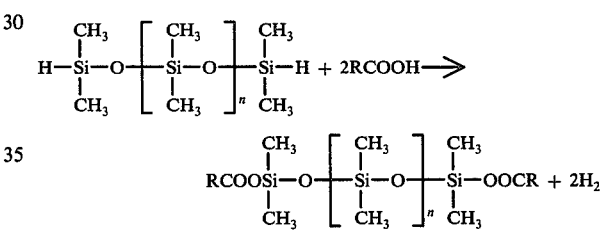

With any of these methods, the above compounds of the formula (I) can be synthesized with good yeilds.

Preparation Example 1

Production of Compound (I-1)

To 134 g (1 mol) of tetramethyldisiloxane:

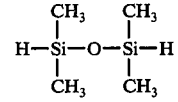

(b.p.: 72° C) obtained through hydrolysis of dimethylmonochlorosilane ((CH$_3$)$_2$HSiCl) were added 288 g (2 mols) of capric acid (C$_7$H$_{15}$COOH), 200 g of toluene, and 0.5 g of Zn powder as a catalyst. The resulting mixture was heated with stirring and refluxed gently. The reaction proceeded with evolution of H$_2$, and the mixture was heated under reflux of toluene for 3 hours. The Zn powder was then removed by filtration and the toluene was distilled away under reduced pressure, and thus 395 g of liquid Compound (I-1) was obtained. Yield 95%.

Preparation Example 2

Production of Compound (I-6)

A solution of 287 g (0.5 mol) of α,ω-dichloropolydimethylsiloxane having the formula:

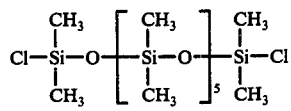

obtained through the equilibration reaction of dimethyldichlorosilane ($(CH_3)_2SiCl_2$) and octamethylcyclotetrasiloxane ($[(CH_3)_2SiO]_4$), in 100 g of toluene was added dropwise to a mixed solution of 228 g (1 mol) of myristic acid ($C_{13}H_{27}COOH$), 101 g of (1 mol) of triethylamine (($C_2H_5)_3N$), and 200 g of toluene with vigorous stirring over a 30 minute period, and were reacted. After the addition, the reaction mass was heated under reflux of toluene for 1 hour. The amine hydrochloric acid salt produced were separated by filtration, and the toluene was distilled away under reduced pressure. Thus, 370 g of waxy Compound (I-6) having a melting point of about 50° C was obtained. Yield 85%.

Preparation Example 3

Production of Compound (I-9)

To 335 g (0.2 mol) of α,ω-dimethoxypolydimethylsiloxane obtained through an equilibration reaction of dimethyldimethoxysilane ($(CH_3)_2Si(OCH_3)_2$) and octamethylcyclotetrasiloxane ($[(CH_3)_2SiO]_4$) and having the formula:

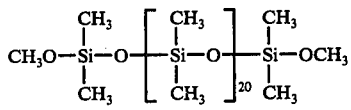

were added 113 g (0.4 mol) of oleic acid ($C_{17}H_{33}COOH$), 450 g of toluene, and 1 g of $CF_3COOH$ as a catalyst, and the resulting mixture was heated at 110° C with stirring. The methanol produced was removed together with the toluene by means of a distillation receiver. After distillation away of substantially the theoretical amount of methanol, the toluene was distilled away under reduced pressure, and thus 370 g of liquid Compound (I-9) was obtained. Yield 96.5%.

In the magnetic recording member of the present invention, a ferromagnetic powder, a binder, and an organic silicone compound represented by the formula (I) are dispersed in an organic solvent and kneaded to prepare a magnetic coating solution, and the magnetic coating solution is coated on a non-magnetic support and dried to form a magnetic layer thereon.

A method of producing a magnetic coating composition for use in the present invention is described in detail in Japanese Patent Publication Nos. 15/1960, 26794/1964, 186/1968, 28043/1972, 28045/1972, 28046/1972, 28048/1972, 31445/1972, 11162/1973, 21331/1973, 33683/1973, Russian Pat. No. 380,033, U.S. Pat. Nos. 2,581,414, 2,855,156, 3,240,621, 3,526,598, 3,728,262, 3,790,407, 3,836,393, etc. The magnetic coating compositions described in the above patents are composed mainly of a ferromagnetic powder, a binder, and a coating solvent, and in addition, sometimes, contain additives, such as dispersing agents, lubricants, abrasives, antistatic agents, etc.

Useful examples of ferromagnetic powders of the present invention include ferromagnetic iron oxide, ferromagnetic chromium dioxide, and ferromagnetic alloy powders.

The term "ferromagnetic iron oxide" used above designates a ferromagnetic iron oxide of the formula $FeO_x$, where x ranges from $1.33 \leq x \leq 1.50$, i.e., maghemite (γ-$Fe_2O_3$, x = 1.50), magnetite ($Fe_3O_4$, x = 1.33), and the Berthollide compound thereof ($FeO_x$, $1.33 \leq x \leq 1.50$).

The above value of x is indicated by the equation:

$$x = \frac{1}{2 \times 100} \times \left\{ 2x \left( \begin{array}{c} \text{atomic \% of} \\ \text{divalent iron} \end{array} \right) + 3x \left( \begin{array}{c} \text{atomic \% of} \\ \text{trivalent iron} \end{array} \right) \right\}$$

Divalent metals may be added to these iron oxides. Examples of divalent metals include Cr, Mn, Co, Ni, Cu, Zn, etc., and they can be employed in an amount up to about 10, e.g., 0 to 10 atomic% based upon the above iron oxide.

$CrO_2$ or $CrO_2$ to which metals, e.g., Na, K, Ti, V, Mn, Fe, Co, Ni, Tc, Ru, Sn, Ce, Pb, and the like, semiconductors, e.g., P, Sb, Te, and the like, or the oxides thereof are added in an amount of up to about 20% by weight, i.e., 0 to 20% by weight, can be used as the above described chromium dioxide.

The acicular ratio of the above iron oxide and chromium oxide, and the average length thereof can be about 2:1 to 20:1, and can range from about 0.2 to about 2.0 μm, respectively.

The above ferromagnetic alloy powder contains a metal component of not less than about 75% by weight, in which the metal component contains about 80% by weight or more of at least one ferromagnetic metal, i.e., Fe, Co, Ni, Fe—Co, Fe—Ni, Co—Ni, or Co—Ni—Fe, and about 20% by weight or less, preferably 0.5 to 5% by weight of Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P, etc. Sometimes, the powder contains a small amount of water, hydroxides, or oxides.

The particle size of the ferromagnetic alloy powder is about 50 to about 1,000 Å, and 2 to about 20 particles are linked to form a particle chain.

These ferromagnetic powders are described in Japanese Patent Publication Nos. 5515/1961, 4825/1962, 5009/1964, 10307/1964, 14090/1969, 18372/1970, 22062/1972, 22513/1972, 28466/1971, 38755/1971, 4286/1972, 12422/1972, 17284/1972, 18509/1972, 18573/1972, 39639/1972, U.S. Pat. Nos. 3,026,215, 3,031,341, 3,100,194, 3,242,005, 3,389,014, British Pat. Nos. 752,659, 782,762, 1,007,323, French Pat. No. 1,107,654, West German Patent Application (OLS) No. 1,281,334, etc.

Binders which can be used in the present invention are hitherto known thermoplastic resins, thermosetting resins, reactive type resins, and mixtures thereof.

Suitable examples of thermoplastic resins are those having a softening point of not more than about 150° C, an average molecular weight of about 10,000 to about 200,000, and a degree of polymerization of about 200 to about 2,000, for example, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, polyvinyl fluoride, a vinylidene chloride-acrylonitrile copolymer, a butadiene-acrylonitrile copolymer, a polyamide resin, polyvinyl butyral, cellulose derivatives (cellulose acetate butyrate, cellulose diacetate, cellulose triacetate, cellulose propionate, nitrocellulose, and the like), a styrene-butadiene copolymer, a polyester resin, an amino resin, various kinds of synthetic rubber base thermoplastic resins (polybutadiene, polychloroprene, polyisoprene, a styrene-butadiene copolymer, and the like), and mixtures thereof, etc.

These resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973, and U.S. Pat. Nos. 3,144,352, 3,419,420, 3,499,789 and 3,713,887.

Examples of thermosetting resins and reactive type resins have a molecular weight of not more than about 200,000 as a coating solutions thereof, and when they are coated and dried, their molecular weight becomes infinite through reactions such as condensation, addition, and the like. Of these resins, those resins which do not soften or melt before they are heat-decomposed, are preferred. In more detail, the following resins can be used: a phenol-formaldehyde-novolak resin, a phenol-formaldehyde-resole resin, a phenol-furfural resin, a xylene-formaldehyde resin, a urea resin, a melamine resin, a drying oil-modified alkyd resin, a phenol-formaldehyde resin-modified alkyd resin, a maleic acid resin-modified alkyd resin, an unsaturated polyester resin, an epoxy resin and a curing agent (polyamines, acid anhydrides, polyamide resins, and the like), a moisture curing type polyester resin containing terminal isocyanate groups, a moisture curing type polyester resin containing terminal isocyanate groups, a polyisocyanate prepolymer (a compound containing 3 or more isocyanate groups in the molecule which is obtained through the reaction of a diisocyanate and a low molecular weight triol, and trimer and tetramer of a diisocyanate), a resin containing a polyisocyanate prepolymer and an active hydrogen (a polyester polyol, a polyetherpolyol, an acrylic acid copolymer, a maleic acid copolymer, a 2-hydroxyethyl methacrylate copolymer, a p-hydroxystyrene copolymer, and the like), and mixtures thereof, etc.

These resins are described in Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, and 28922/1972, and U.S. Pat. Nos. 3,144,353, 3,320,090, 3,437,510, 3,597,273, 3,781,210 and 3,781,211.

These binders can be used individually or in combination with each other, and other additives can be added thereto. The binder is generally used in an amount of about 10 to about 400 parts by weight, preferably 30 to 200 parts by weight, and more preferably 15 to 100 parts by weight, per 100 parts by weight of the ferromagnetic powder.

The magnetic recording layer may contain, in addition to the above binder and ferromagnetic powder, additives such as dispersing agents, lubricants, abrasives, antistatic agents, and the like.

Dispersing agents which can be used in the present invention include aliphatic acids containing 12 to 18 carbon atoms (e.g., $R_1COOH$, where $R_1$ is an alkyl or alkenyl group containing 11 to 17 carbon atoms) such as capric acid, caprylic acid, lauric acid, myristic acid, palmitic acid, stearic acid, oleic acid, elaidic acid, linolic acid, linolenic acid, stearolic acid, and the like; metal soaps comprising the alkali metal (Li, Na, K, etc.) or alkali earth metal (Mg, Ca, Ba, etc.) salt of the above aliphatic acids; the fluorinated derivatives of the above aliphatic esters; amides of the above aliphatic acids; polyalkyleneoxide alkylphosphoric acid esters; lecithin; trialkylpolyolefinoxy quaternary ammonium salts (where the alkyl moiety contains 1 to 5 carbon atoms, and the olefin is ethylene, propylene, or the like); and the like. In addition, higher alcohols containing 12 or more carbon atoms, and the sulfuric acid esters, or the like thereof, etc., can be used. The dispersing agent is generally used in a range of about 0.5 to about 20 parts by weight per 100 parts by weight of the binder.

These dispersing agents are described in Japanese Patent Publication Nos. 28369/1964, 17945/1969, 7441/1973, 15001/1973, 15002/1973, 16363/1973, 4121/1975, U.S. Pat. Nos. 3,387,993, 3,470,021, etc.

The additives of the present invention (formula (I)) can be used in combination with these dispersing agents without deteriorating at all the dispersibility of the ferromagnetic powder.

Electrically conductive fine powders such as carbon black, graphite, carbon black graft polymer, and the like; inorganic fine powders such as molybdenum disulfide, tungsten disulfide, and the like; synthetic resin fine powders such as polyethylene, polypropylene, an ethylene-vinyl chloride copolymer, polytetrafluoroethylene, and the like; α-olefin polymers; unsaturated aliphatic hydrocarbons which are liquid at ordinary temperature (compounds in which the n-olefin double bond is connected to the terminal carbon, and which contains about 5 to about 20 carbon atoms); aliphatic acid esters of monobasic aliphatic acids containing 12 to 20 carbon atoms and monovalent alcohols containing 3 to 12 carbon atoms; and the like can be used as lubricants. The lubricant is generally employed in a proportion of about 0.2 to about 20 parts by weight per 100 parts by weight of the binder.

These lubricants are described in Japanese Patent Publication Nos. 18064/1966, 23889/1968, 40461/1971, 15621/1972, 18482/1972, 28043/1972, 32001/1972, 5042/1975, U.S. Pat. Nos. 3,470,021, 3,492,235, 3,497,411, 3,523,086, 3,625,760, 3,630,772, 3,642,539, "IBM Technical Disclosure Bulletin" Vol. 9, No. 7, page 779 (December, 1966), "ELEKTRONIK" No. 12, page 380 (1961), etc.

When the organic silicone compounds of the present invention are used in combination with, in particular, the above aliphatic acid esters, especially preferred results can be obtained.

Suitable examples of abrasives which can be used in the present invention are those commonly used materials such as fused alumina, silicone carbide, chromium oxide, corundum, synthetic corundum, diamond, synthetic diamond, garnet, emery (main component: corundum and magnetite), and the like. Those abrasives having a Mohs hardness of not less than about 5, and an average particle size of about 0.05 to about 5μ, preferably 0.1 to 2μ, are generally used. The abrasive is used, in general, in a range of about 0.5 to about 20 parts by weight per 100 parts by weight of the binder.

These abrasives are described in Japanene Patent Publication Nos. 18572/1972, 15003/1973, 15004/1973

(U.S. Pat. No. 3,617,378), 39402/1974, 9401/1975, U.S. Pat. Nos. 3,007,807, 3,041,196, 3,293,066, 3,630,910, 3,687,725, British Pat. No. 1,145,349, West German Pat. (DT-PS) Nos. 853,211 and 1,101,000.

The use of the additives of the present invention in combination with these abrasives reduces the head wear due to the abrasives.

As antistatic agents, electrically conductive fine powders such as carbon black, graphite, carbon black graft polymer, and the like; natural surface active agents, such as saponin, and the like; nonionic surface active agents, such as alkyleneoxide based, glycerin based, glycidol based, and like nonionic surface active agents; cationic surface active agents, such as higher alkylamines, quaternary ammonium salts, pyridine, and other heterocyclic compounds, phosphonium or sulphonium compounds, and the like; anionic surface active agents containing acidic groups, such as a carboxylic acid group, a sulfonic acid group, a phosphoric acid group, a sulfate group, a phosphate group, and the like; ampholytic surface active agents, such as amino acids, aminosulfonic acids, the sulfate or phosphate of an aminoalcohol, and the like; etc., can be used.

The above electrically conductive fine powder is generally employed in an amount of about 0.2 to about 20 parts by weight per 100 parts by weight of the binder, and the surface active agent is generally used in an amount of about 0.1 to about 10 parts by weight per 100 parts by weight of the binder.

Suitable examples of electrically conductive fine powders and surface active agents which can be used as antistatic agents in the present invention are described in Japanese Patent Publication Nos. 22726/1971, 24881/1972, 26882/1972, 15440/1973, 26761/1973, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 3,545,974, West German Patent Application (OLS) No. 1,942,665, British Pat. Nos. 1,077,317, 1,198,450, etc., and in Ryohei Oda et al., *Kaimen Kasseizai no Gosei to Sono Oyo (Synthesis of Surface Active Agents and Application of Same)*, Maki Shoten (1964), A. M. Schwartz & J. W. Perry, *Surface Active Agents*, Interscience Publications Incorporated (1958), J. P. Sisley, *Encyclopedia of Surface Active Agents*, Vol. 2, Chemical Publishing Co., (1964), *Kaimenkasseizai Binran (Encyclopedia of Surface Active Agents)*, 6 Ed., Sangyo Tosho Co., Ltd. (Dec. 20, 1966), etc.

These surface active agents may be used individually or in combination with each other. They are generally used as antistatic agents, but sometimes for other purposes, for example, for improving dispersion properties, magnetic characteristics, and lubricity, or as auxiliary coating agents.

The above components are dissolved in an organic solvent, and kneaded and dispersed to prepare a coating solution, and the resulting coating solution is coated on a non-magnetic support and dried to thus prepare the magnetic recording layer of the present invention. After coating but before drying of the magnetic layer, a treatment to orient the magnetic powder contained in the magnetic layer can be applied, and furthermore, after the drying, the surface of the magnetic layer can be subjected to a smoothening treatment. The above described magnetic layer generally has a thickness (dry basis) ranging from about 0.5 to about 20 $\mu$m, preferably 1 to 10 $\mu$m.

Examples of materials for non-magnetic supports which can be used are polyesters, such as polyethylene terephthalate, polyethylene-2,6-naphthalate, and the like, polyolefins, such as polypropylene, and the like, cellulose derivatives, such as cellulose triacetate, cellulose diacetate, and the like, synthetic resins, such as polycarbonate, and the like, non-magnetic metals, such as Cu, Al, Zn, and the like, ceramics, such as glass, porcelain, earthenware, and the like, etc.

The form of the non-magnetic support can be that of a film, a tape, a sheet, a disc, a card, a drum, and the like, and, depending upon the form, various materials can be selected.

The thickness of the non-magnetic support, when in the form of a film, tape, or sheet, is about 2 to about 50 $\mu$m, preferably 3 to 25 $\mu$m. When in the form of a disc or card, the thickness is as much as about 0.5 to about 10 mm, and when in the form of a drum, the form is cylindrical and its form is determined according to the kind of a recorder with which it is to be used.

Where the non-magnetic support is a flexible support, such as a film, a tape, a sheet, a thin flexible disc, or the like, the surface opposite the side on which the magnetic layer is provided, may be subjected to backcoating for the purposes of preventing static charging, transfer, and wow and flutter.

Backcoating is described in U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688, 3,761,311, etc.

The ferromagnetic powder, binder, organic silicone compound of the present invention, dispersing agent, lubricant, abrasive, antistatic agent, solvent, and the like are kneaded to thus form a magnetic coating composition.

In this kneading, the magnetic powder, and the other components are charged to a kneader, all at the same time, or individually successively. For example, a method in which a magnetic powder is added to a solvent containing a dispersing agent and kneaded for a predetermined period to form a magnetic coating composition, and so on can be employed.

In kneading and dispersing the magnetic coating solution, various kinds of kneaders can be employed. For instance, a two-roll mill, a three-roll mill, a ball mill, a pebble mill, a trommel, a sand grinder, a Szegvari attritor, a high speed impeller dispersing machine, a high speed stone mill, a high speed impulse mill, a disper, a kneader, a high speed mixer, a homogenizer, a supersonic dispersing machine, etc., can be employed.

Techniques as to kneading and dispersion are described in T. C. Patton, *Paint Flow and Pigment Dispersion*, John Wiley & Sons Co., Ltd., (1964), and also in U.S. Pat. Nos. 2,581,414 and 2,855,156.

Coating of the above magnetic recording layer on the support can be carried out by using air doctor coating, blade coating, air knife coating, squeeze coating, dip coating, reverse roll coating, transfer roll coating, gravure coating, kiss coating, cast coating, spray coating, and other methods. Detailed descriptions concerning these techniques are described in *Coating Engineering*, published by Asakura Shoten, Tokyo, pp. 253 to 277 (Mar. 20, 1971).

In producing the magnetic recording member of the present invention, the magnetic layer is coated on the non-magnetic support using the above coating method, and dried. By repeating this procedure, two or more magnetic layers can be provided on the support. Moreover, as described in Japanese Patent Application (OPI) Nos. 9880/1973 (West German Patent Application (OLS) No. 2,309,159) and 99233/1973 (West German Patent Publication (ALS) No. 2,309,158), etc., two or more layers can be provided at the same time using a multiple layer simultaneous coating method.

Suitable examples of organic solvents which can be used in coating are ketones, such as acetone, methyl ethyl ketone, methyl isobutyl ketone, cyclohexanone, and the like; alcohols, such as methanol, ethanol, propanol, butanol, and the like, esters, such as methyl acetate, ethyl acetate, butyl acetate, ethyl lactate, acetic acid glycol monoethyl ether, and the like, ethers and glycol ethers, such as diethyl ether, glycol dimethyl ether, glycol monoethyl ether, dioxane, and the like, tars (aromatic hydrocarbons), such as benzene, toluene, xylene, and the like, chlorinated hydrocarbons, such as methylene chloride, ethylene chloride, carbon tetrachloride, chloroform, ethylenechlorohydrin, dichlorobenzene, and the like, etc.

The magnetic layer coated on the support in this way is dried after, as necessary, a treatment to orient the magnetic powder contained in the magnetic layer is applied. After a surface smoothening processing is applied, as necessary, the magnetic recording member is cut to the desired form, and thus the magnetic recording member of the present invention is obtained. In the present invention, it has been found that application of a method of smoothening the surface of the magnetic recording member provides a magnetic recording member having a smooth surface and an excellent durability.

In this case, the orientation magnetic field can be an A.C. field or a D.C. field with a strength as much as about 500 to about 2,000 gauss. The drying temperature of the magnetic field generally is about 50° to 120° C, preferably about 70° to 100° C, and more preferably about 80° to 90° C; the amount of air flow is about 1 to about 5 kl/m$^2$, preferably 2 to 3 kl/m$^2$; and the drying period is about 30 seconds to about 10 minutes, preferably 1 to 5 minutes.

The direction of orientation of the magnetic member is determined depending on the application thereof. That is, in the case of a sound tape, a small size video tape, a memory tape, or the like, the orientation is parallel to the lengthwise direction of the tape, and in the case of a video tape for broadcasting, the orientation is at an angle of 30° to 90° relative to the lengthwise direction.

Methods of orienting the magnetic powder are described in the following patents: U.S. Pat. Nos. 1,949,840, 2,796,359, 3,001,891, 3,172,776, 3,416,949, 3,473,960, 3,681,138, Japanese Patent Publication Nos. 3427/1957, 28368/1964, 23624/1965, 23625/1965, 13181/1966, 13043/1973, 39722/1973, etc.

As described in West German Patent Publication (ALS) No. 1,190,985, the direction of orientation of the upper layer and the lower layer can be different from each other. As the surface smoothening treatment of the magnetic layer before drying thereof, those methods using a magnetic smoother, a smoothening coil, a smoothening blade, a smoothening blanket, and the like can be used. These methods are described in Japanese Patent Publication No. 38802/1972, British Pat. No. 1,191,424, Japanese Patent Publication No. 11336/1973, Japanese Patent Application (OPI) No. 53631/1974, etc.

The surface smoothening treatment of each magnetic layer after the drying thereof can be carried out by calendering. In effecting calendering, it is preferred to employ the super calender method in which the member is passed between two rolls, e.g., a metal roll, and a cotton or synthetic resin (e.g., nylon) roll. The super calendering is preferably carried out under the conditions such that the pressure between the rolls is about 25 to about 100 kg/cm, preferably 30 to 80 kg/cm, the temperature is about 35° to about 100° C, preferably 40° to 80° C, and the speed of processing is about 5 to about 120 m/min. On operation above the upper temperature and upper pressure limits, the magnetic layer and nonmagnetic support are adversely affected. Where the speed of processing is below about 5 m/min, the effect of the surface smoothening cannot be obtained, and above about 120 m/min, surface smoothening becomes difficult.

These surface smoothing treatments are described in U.S. Pat. Nos. 2,688,567, 2,998,325, 3,783,023, West German Patent Application (OLS) No. 2,405,222, Japanese Patent Application (OPI) Nos. 53631/1974, 10337/1975, etc.

It goes without saying that the incorporation of the organic silicone compound of the present invention into the magnetic layer improves the running properties and durability of a magnetic recording member in which a metal oxide powder is used as a ferromagnetic substance. Furthermore, it has been found that the incorporation of the organic silicone compound markedly improves the running properties and durability of a magnetic recording member in which a ferromagnetic alloy powder is used, and which characteristics have hitherto been difficult to improve. In addition, it has been found that the organic silicone compounds of the present invention have the effect of retarding the oxidative degradation of ferromagnetic alloy powders.

It has been found that with magnetic recording members in which the organic silicone compounds of the present invention are used, the head wear is reduced to below about half of that existing with conventional magnetic recording members. It has further been found that under high temperature and high humidity conditions of not less than about 40° C and about 80% RH, the running properties are not deteriorated.

The present invention will be explained in greater detail by reference to the following examples and comparison examples. It can be easily understood by one skilled in the art that the components, ratios, order of operation, and the like shown therein can be changed within a range which does not depart from the spirit of the present invention. Therefore, the present invention is not intended to be limited to the following examples. All parts, percentages, ratios and the like are by weight unless otherwise indicated.

EXAMPLE 1

| Magnetic Coating Solution A | |
|---|---|
| | Amount (parts) |
| Co-containing Berthollide Iron Oxide (FeO$_{1.4}$ containing 1.5 atomic % of Co; Hc: 610 Oe; particle length: 0.6 μm; acicular ratio: 10:1) | 300 |
| Vinyl Chloride-Vinylidene Chloride Copolymer (copolymerization ratio (mole): 7/3; degree of polymerization: | 27 |

-continued

| Magnetic Coating Solution A | Amount (parts) |
| --- | --- |
| about 300) | |
| Polyesterpolyurethane | 28 |
| (reaction product of polyethylene | |
| adipate and 4,4'-diphenylmethane | |
| diisocyanate; average molecular | |
| weight (molecular weight corresponding | |
| to styrene): about 130,000) | |
| Soybean Lecithin | 3 |
| Organic Silicone Compound | 3 |
| (See Table 1 below) | |
| Butyl Acetate | 500 |
| Methyl Ethyl Ketone | 200 |

The above components were placed in a ball mill and subjected to a kneading and dispersing treatment for 24 hours. Then, after addition of 14 parts of a polyisocyanate compound (Desmodur L-75 produced by Bayer A.G., 75% by weight solution of an adduct of 1 mole of trimethylolpropane and 3 moles of toluenediisocyanate in ethyl acetate), the mixture was subjected to a high speed shear dispersion for 2 hours. After the above treatment, the mixture was filtered with a filter having an average pore diameter of 3 μm, and thus Magnetic Coating Solution A was obtained.

Magnetic Coating Solution A was coated on a 22 μm thick polyethylene terephthalate film in a dry thickness of 6 μm by doctor coating. This film was subjected to a magnetic field orientation in a D.C. magnetic field of 2,500 Gauss for 0.02 second, and dried at 100° C, with the amount of air flow being 3 kl/m², for 2 minutes. Then, the resulting member was subjected to a super calender roll treatment under the conditions of a temperature of 60° C, a pressure of 60 kg/cm, and a speed of 40 m/min, and thus a wide magnetic recording film was obtained. This film was slit to thus obtain a video tape having a width of ½ inch.

Table 1 shows the organic silicone compounds used in preparing Magnetic Coating Solution A ($C_1$ to $C_4$: comparison examples), and the properties of the video tapes produced using the organic silicone compounds.

Table 1

| Sample No. | Organic Silicone Compound in Magnetic Coating Solution A | Coefficient of[*1] Kinetic Friction Load 100 g | Load 200 g | Durability[*2] (min) | Blooming[*3] |
| --- | --- | --- | --- | --- | --- |
| 1 | I-1 | 0.16 | 0.31 | 70 | 5 |
| 2 | I-2 | 0.17 | 0.30 | 100 | 5 |
| 3 | I-3 | 0.15 | 0.29 | 120 | 5 |
| 4 | I-4 | 0.15 | 0.30 | 65 | 5 |
| 5 | I-5 | 0.21 | 0.33 | 50 | 5 |
| 6 | I-6 | 0.20 | 0.32 | 90 | 5 |
| 7 | I-7 | 0.17 | 0.31 | 100 | 5 |
| 8 | I-8 | 0.19 | 0.32 | 55 | 5 |
| $C_1$ | — | 0.53 | — | 5 | 5 |
| $C_2$ | Dimethyl Polysiloxane (average degree of polymerization: about 60) | 0.38 | — | 30 | 1 |
| $C_3$ | Compound of the Formula (II) R,R' = $C_{18}H_{37}$, n = 0 | 0.27 | 0.33 | 35 | 2 |
| $C_4$ | Compound of the Formula (III) R, R' = $C_{18}H_{37}$, m = 1, R" = $CH_3$, $n_1 + n_2$ = 10 | 0.21 | 0.37 | 40 | 3 |

Note:

*1 Coefficient of Kinetic Friction

Value of each sample measured using a measuring apparatus having the structure shown in FIG. 1. (With Samples $C_1$ and $C_2$ in Table 1, the coefficient of kinetic friction under a load of 200 g was too large to be measured.)

In FIG. 1, A indicates a Y alloy drum of a diameter of 115.8 mm whose surface is polished, and through rotation of this drum (31.4 rpm), Sample Tape B is rubbed at a relative speed of 19.0 cm/sec (which corresponds to the friction condition between a drum and a tape of the standard I type VTR). C indicates a tension detecting unit, and D indicates a weight providing tension to the tape. This coefficient of kinetic friction is determined using the following equation:

$$\text{Coefficient of Kinetic Friction } (\mu) = \frac{1}{\pi} l_n \frac{W}{W_0}$$

wherein $W_0$ is the load of Weight D, and $W$ is the tension measured with C. The measurement is conducted under a load of 100 g or 200 g.

*2 Durability (min)

Time (min) taken for anything unusual to appear on a TV picture when a test pattern recorded using the standard I type VTR (AV-7800, produced by SONY Corp.) is subjected to a still picture reproduction.

*3 Blooming

Each sample tape is wound while applying a tension of 2 kg, and allowed to stand in an atmosphere of 60° C and 90% RH for 24 hours. Then the blooming on the surface of the magnetic layer was determined, and it was indicated by the ratio of blooming per cm² (0% = 5, 1 to 25% = 4, 26 to 50% = 3, 51 to 75% = 2, 76 to 100% = 1).

Load in Table 1

The relationship between $W_0(g)$ and the coefficient of kinetic friction ($\mu$) is measured using the apparatus shown in FIG. 1, and it is shown in FIG. 2 in connection with Samples 3*, 5*, $C_1$, and $C_2$. In FIG. 2, the ordinate indicates the coefficient of kinetic friction ($\mu$) and the abscissa indicates $W_0$ (g).

EXAMPLE 2

| Magnetic Coating Solution B | Amount (parts) |
| --- | --- |
| Fe—Co—Cr (70:25:5 wt %) Alloy Fine Powder (containing about 3 wt % of B; Hc = 950 Oe; average particle diameter: 400 Å; average length: 10 to 15 times the above particle diameter) | 300 |
| Polyesterpolyurethane (Same as used in Coating Solution A) | 20 |
| Synthetic Non-drying Oil-modified Alkyd Resin (reaction product of glycerin, phthalic anhydride, and synthetic non-drying oil; oil length: 29%; hydroxy value: about 130) | 25 |
| Oleic Acid | 3 |
| Organic Silicone Compound (See Table 2 below) | 3 |
| Butyl Acetate | 600 |

The above components were placed in a ball mill and subjected to a kneading and dispersing treatment for 24 hours. Then, after addition of 20 parts of a polyisocyanate compound (Desmodur L-75, as described in Example 1), the mixture was subjected to a high speed shear dispersion for 1 hour. After the above treatment, the mixture was filtered with a filter having an average pore diameter of 3 μm, and thus Magnetic Coating Solution B was obtained.

Magnetic Coating Solution B was processed in the same manner as in Example 1 except that the dry thickness was 3 μm, and drying conditions of a temperature of 100° C, drying period of 2 minutes and amount of air flow of 2 kl/m² were employed, and thus a video tape of a width of ½ inch was obtained.

Table 2 shows the kind of organic silicone compounds used in preparing Magnetic Coating Solution B, and the characteristics of the video tapes obtained ($C_5$ to $C_8$: comparison examples).

Table 2

| Sample No. | Organic Silicone Compound in Magnetic Coating Solution B | Coefficient of[1] Kinetic Friction Load 100 g | Load 200 g | Dura-[2] bility (min) | Bloom-[3] ing | Deterio-[4] ration with Time (%) |
|---|---|---|---|---|---|---|
| 9 | I-1 | 0.19 | 0.32 | 60 | 5 | 5 |
| 10 | I-2 | 0.15 | 0.30 | 65 | 5 | 5 |
| 11 | I-3 | 0.14 | 0.30 | 120 | 5 | 4 |
| 12 | I-4 | 0.15 | 0.31 | 55 | 5 | 3 |
| 13 | I-5 | 0.21 | 0.32 | 30 | 5 | 6 |
| 14 | I-6 | 0.20 | 0.31 | 80 | 5 | 6 |
| 15 | I-7 | 0.18 | 0.31 | 90 | 5 | 4 |
| 16 | I-8 | 0.19 | 0.32 | 40 | 5 | 3 |
| $C_5$ | — | 0.52 | — | 0.1 | 5 | 18 |
| $C_6$ | Dimethyl Polysiloxane (average degree of polymerization: about 60) | 0.36 | — | 15 | 1 | 12 |
| $C_7$ | Compound of Formula (II) R, R' = $C_{18}H_{37}$, n = 0 | 0.28 | 0.35 | 20 | 2 | 8 |
| $C_8$ | Compound of Formula (III) R, R' = $C_{18}H_{37}$, m = 1, R'' = $CH_3$, $n_1 + n_2 = 10$ | 0.20 | 0.39 | 25 | 3 | 9 |

Note:
[1],[2],[3]: Same as in Table 1.
[4]Deterioration with time (%): Ratio of (magnetic flux density of each sample after such is allowed to stand in an atmosphere of 60° C and 90% RH for one week) to (initial magnetic flux density of the sample). After the tape is allowed to stand, the magnetic flux density decreases.

From the results of Examples 1 and 2, i.e., Tables 1 and 2, and FIG. 2, those magnetic recording members prepared by using the organic silicone compound of the present invention were confirmed to have low coefficient of kinetic friction which were not obtained with conventional organic silicone compounds, have excellent durability, and furthermore, are free from blooming.

In particular, Table 2 shows that the organic silicone compounds of the present invention greatly increase the durability of magnetic recording members prepared using ferromagnetic alloy powders, the durability of which, if no organic silicone compounds are used, would be short, and that they reduce the deterioration with time of ferromagnetic alloy powders.

EXAMPLE 3

A ½ inch wide video tape was produced in the same manner as in Example 2 except that R and R' of formula (I) of the organic silicone compound of the present invention in Magnetic Coating Solution B were changed as shown in Table 3. The characteristics of each sample obtained are also shown in Table 3.

Table 3

| Sample No. | Compound of Formula (I) in Magnetic Coating Solution B | Coefficient of[1] Kinetic Friction Load 100 g | Load 200 g | Dura-[2] bility (min) | Bloom-[3] ing | Deterio-[4] ration with Time (%) |
|---|---|---|---|---|---|---|
| $C_9$ | R, R' = $C_3H_7$, n = 0 | 0.25 | 0.43 | 15 | 5 | 8 |
| $C_{10}$ | R, R' = $C_5H_{11}$, n = 0 | 0.22 | 0.37 | 20 | 5 | 6 |
| 9 | I-1 | 0.19 | 0.32 | 60 | 5 | 5 |
| 12 | I-4 | 0.15 | 0.31 | 55 | 5 | 3 |
| $C_{11}$ | R, R' = $C_{25}H_{51}$, n = 0 | 0.20 | 0.38 | 50 | 4 | 4 |

Note:
[1],[2],[3],[4]: Same as described in Tables 1 and 2.

From the results in Table 3, those organic silicone compounds, in which R and R' contain 7 to 21 carbon atoms, were demonstrated to be preferred in that the magnetic recording members obtained have a low coefficient of kinetic friction and high durability. It was also confirmed that where the number of carbon atoms was 6 or less, the durability was not improved, and where the number of carbon atoms was 22 or more, sufficient improvement in the coefficient of kinetic friction was not observed.

EXAMPLE 4

A ½ inch wide video tape was produced in the same manner as in Example 2 except that n of the organic silicone compound of Formula (I) of the present invention in Magnetic Coating Solution B was changed as shown in Table 4. The characteristics of each sample obtained are also shown in Table 4.

(Samples 19, 20). Table 5 shows the organic silicone compound of the formula (I) used, the amount thereof, Table 4

| Sample No. | Compound of Formula (I) in Magnetic Coating Solution B | Coefficient of[*1] Kinetic Friction Load 100 g | Coefficient of[*1] Kinetic Friction Load 200 g | Dura-[*2] bility (min) | Bloom-[*3] ing | Deterio-[*4] ration with Time (%) |
|---|---|---|---|---|---|---|
| 11 | I-3, n = 0 | 0.14 | 0.30 | 120 | 5 | 4 |
| 15 | I-7, n = 5 | 0.17 | 0.31 | 90 | 5 | 4 |
| 17 | I-9, n = 20 | 0.17 | 0.34 | 65 | 5 | 5 |
| 18 | I-10, n = 50 | 0.23 | 0.38 | 35 | 4 | 8 |
| C$_{12}$ | R, R' = C$_{17}$H$_{33}$, n = 80 | 0.38 | — | 20 | 2 | 11 |

Note:
[*1], [*2], [*3], and [*4]: Same as described in Tables 1 and 2.

The relationship between the value of $n$ of the organic silicone compound shown in Table 4 and the coefficient of kinetic friction ($\mu$) under a 100 g load is shown in FIG. 3, and the relationship between the value of $n$ and the durability (min) is shown in FIG. 4.

In FIG. 3, the ordinate indicates the coefficient of kinetic friction ($\mu$) and the abscissa indicates the value of $n$ in the formula (I). In FIG. 4, the ordinate indicates the durability (min) and the abscissa indicates value of $n$ of formula (I).

The results in Table 4, and FIGS. 3 and 4 show that when $n$ of the organic silicone compound of the formula (I) is zero, the coefficient of kinetic friction is the lowest, the durability is the highest, and the deterioration with time is the lowest, and thus where $n=0$ is most preferred.

and the characteristics of each sample.

Table 5

| Sample No. | Compound of Formula (I) | Amount Added (parts by weight) | Coefficient of[*1] Kinetic Friction Load 100 g | Coefficient of[*1] Kinetic Friction Load 200 g | Durability[*2] (min) | Blooming[*3] |
|---|---|---|---|---|---|---|
| 19 | I-4 | 0.5 | 0.29 | 0.35 | 20 | 5 |
| 12 | I-4 | 3.0 | 0.15 | 0.31 | 55 | 5 |
| 20 | I-4 | 12.0 | 0.14 | 0.29 | 85 | 2 |

Note:
[*1], [*2], and [*3]: Same as described in Table 1.

The above results show that the organic silicone compound of the formula (I) of the present invention can be employed in an amount of 0.1 to 10 parts by weight per 100 parts of the ferromagnetic powder, and in particular, the desired characteristics can be obtained by use of an amount of 0.2 to 3 parts by weight.

EXAMPLE 6

A ½ inch wide video tape was produced in the same manner as in Example 2 except that a magnetic coating solution was prepared by adding 6 parts of Cr$_2$O$_3$ (chromium sequioxide; average particle diameter: 0.5 $\mu$m; Mohs hardness: 8) as an abrasive to Magnetic Coating Solution B. This sample was designated as Sample 21. Table 6 shows the characteristics of Sample 21.

Table 6

| Sample No. | Compound of Formula (I) | Abrasive | Coefficient of[*1] Kinetic Friction Load 100 g | Coefficient of[*1] Kinetic Friction Load 200 g | Durability[*2] (min) | Blooming[*3] |
|---|---|---|---|---|---|---|
| 12 | I-4 | — | 0.15 | 0.31 | 55 | 5 |
| 21 | I-4 | Cr$_2$O$_3$ | 0.14 | 0.32 | 120 | 5 |

Note:
[*1], [*2] and [*3]: Same as described in Table 1.

As the value of $n$ increases, the coefficient of kinetic friction increases, and the durability decreases. Thus, the preferred range for $n$ is 0 to 20, and a particularly preferred range is 0 to 5. Those organic silicone compounds in which $n$ is not less than 50 are not preferred in that they fail to improve the coefficient of kinetic friction and to increase the durability.

EXAMPLE 5

A ½ inch wide video tape was produced in the same manner as in Example 2 except that the amount of the organic silicone compound (Sample 12: Compound I-4) in Magnetic Coating Solution B employed was changed The above results show that the use of the abrasive in the present invention increases the durability two or more times that of the original.

EXAMPLE 7

A ½ inch wide video tape was produced in the same manner as in Example 2 except that a magnetic coating solution prepared by adding 2 parts of amyl stearate as a lubricant to Magnetic Coating Solution B was used. This sample was designated as Sample 22. The characteristics of Sample 22 are shown in Table 7 together with those of Sample 12.

Table 7

| Sample No. | Compound of Formula (I) | Lubricant | Coefficient of[1] Kinetic Friction Load 100 g | Coefficient of[1] Kinetic Friction Load 200 g | Durability[2] (min) | Blooming[3] |
| --- | --- | --- | --- | --- | --- | --- |
| 12 | I-4 | — | 0.15 | 0.31 | 55 | 5 |
| 22 | I-4 | Amyl Stearate | 0.14 | 0.30 | 75 | 5 |

Note:
[1], [2], and [3]: Same as described in Table 1.

The above results show that the use of a lubricant in the present invention further increases the durability.

EXAMPLE 8

A ½ inch wide video tape was produced in the same manner as in Example 2 except that in Sample 9, Compound I-11 was used in place of Compound I-1. This sample was designated as Sample 23. Table 8 shows the compounds of the formula (I) and the characteristics of Samples 9 and 23.

Table 8

| Sample No. | Compound of Formula (I) | Coefficient of[1] Kinetic Friction Load 100 g | Coefficient of[1] Kinetic Friction Load 200 g | Durability[2] (min) | Blooming[3] | Deterioration[4] with Time (%) |
| --- | --- | --- | --- | --- | --- | --- |
| 9 | I-1 | 0.19 | 0.32 | 60 | 5 | 5 |
| 23 | I-11 | 0.18 | 0.30 | 70 | 5 | 5 |

Note:
[1], [2], [3], and [4]: Same as described in Tables 1 and 2.

The above results show that the same effect can be attained with those compounds in which the substituents, R and R' are different, i.e., compounds which are unsymmetrical, and that the characteristics are improved with Compound I-11 slightly more than with Compound I-1.

EXAMPLE 9

A ½ inch wide video tape was produced in the same manner as in Example 2 except that two organic silicone compounds were used together. This sample was designated as Sample 24. Table 9 shows the characteristics of Samples 9 and 24.

Table 9

| Sample No. | Magnetic Coating Solution B Compound of Formula (I) | Magnetic Coating Solution B Amount (g) | Coefficient of[1] Kinetic Friction Load 100 g | Coefficient of[1] Kinetic Friction Load 200 g | Durability[2] (min) | Blooming[3] | Deterioration[4] with Time (%) |
| --- | --- | --- | --- | --- | --- | --- | --- |
| 9 | I-1 | 3 | 0.19 | 0.32 | 60 | 5 | 5 |
| 24 | I-1, I-3 | 2, 1 | 0.16 | 0.30 | 75 | 5 | 5 |

[1], [2], [3], and [4]: Same as described in Tables 1 and 2.

The above results show that even when two or more of the organic silicone compounds of the formula (I) are used together, similar effects can be attained.

EXAMPLE 10

A ½ inch wide video tape was produced in the same manner as in Example 1 except that in the composition of Magnetic Coating Solution A (Sample 3), chromium dioxide ($CrO_2$ containing 1 wt% of Te; average particle length: 0.45 μm; needle-like ratio: 10:1; coercive force (Hc): 530 Oe) was used as a ferromagnetic powder. This sample was designated as Sample 25. Table 10 shows the characteristics of Sample 3.

Table 10

| Sample No. | Compound of Formula (I) | Ferromagnetic Powder | Coefficient of[1] Kinetic Friction Load 100 g | Coefficient of[1] Kinetic Friction Load 200 g | Durability[2] (min) | Blooming[3] |
| --- | --- | --- | --- | --- | --- | --- |
| 3 | I-3 | Co-containing Berthollide Iron Oxide | 0.15 | 0.29 | 120 | 5 |
| 25 | I-3 | Te-containing $CrO_2$ | 0.15 | 0.30 | 160 | 5 |

Note:
[1], [2], and [3]: Same as described in Table 1.

The above results show that even though the ferromagnetic powder is changed to chromium dioxide, similar effects can be obtained, and this is true even though it is known that ferromagnetic chromium dioxide acts as an abrasive.

While the invention has been described in detail and with reference to specific embodiments thereof, it will be apparent to one skilled in the art that various changes and modifications can be made therein without departing from the spirit and scope thereof.

What is claimed is:

1. A magnetic recording member comprising a non-magnetic support having thereon a magnetic layer with a ferromagnetic powder dispersed in a binder, wherein the magnetic layer contains at least one organic silicone compound represented by the formula (I):

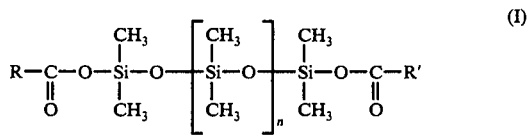 (I)

wherein R and R', which may be the same or different, each is an alkyl or alkenyl group containing 7 to 21 carbon atoms, and n is an integer of 0 to 50, in an amount of about 0.1 to about 5 parts by weight per 100 parts by weight of the ferromagnetic powder.

2. The magnetic recording member according to claim 1, wherein n is 0 to 5.

3. The magnetic recording member according to claim 2, wherein n is 0.

4. The magnetic recording member according to claim 1, wherein the organic silicone compound is present in an amount of 0.2 to 3 parts by weight per 100 parts by weight of the ferromagnetic powder.

5. The magnetic recording member according to claim 1, wherein said non-magnetic support has a thickness of about 2 to about 50 μm.

6. The magnetic recording member according to claim 5, wherein said non-magnetic support is a film, a tape, a sheet or a thin flexible disc.

7. The magnetic recording member according to claim 1, wherein said non-magnetic support has a thickness of about 0.5 to about 10 nm.

8. The magnetic recording member according to claim 7, wherein said non-magnetic support is a disc or card.

9. The magnetic recording member according to claim 1, wherein said magnetic layer is strongly adherent to said magnetic support.

10. The magnetic recording member according to claim 9, wherein said organic silicone compound is selected from the group consisting of:

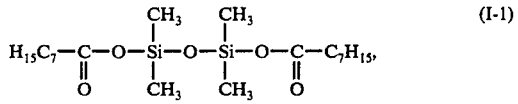 (I-1)

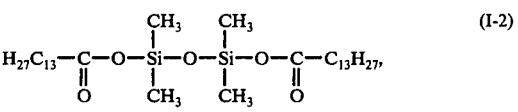 (I-2)

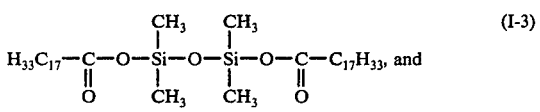 (I-3)

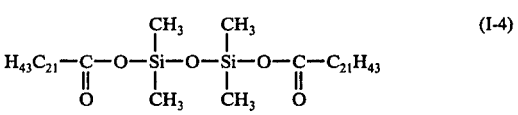 (I-4)

* * * * *